March 22, 1960 R. N. NOYCE 2,929,753

TRANSISTOR STRUCTURE AND METHOD

Filed April 11, 1957 2 Sheets-Sheet 1

INVENTOR.
Robert N. Noyce
BY Flehr and Swain
ATTORNEYS

March 22, 1960 R. N. NOYCE 2,929,753

TRANSISTOR STRUCTURE AND METHOD

Filed April 11, 1957 2 Sheets-Sheet 2

INVENTOR.
Robert N. Noyce

BY Fletcher D. Swain

ATTORNEYS

United States Patent Office 2,929,753

Patented Mar. 22, 1960

2,929,753

TRANSISTOR STRUCTURE AND METHOD

Robert N. Noyce, Los Altos, Calif., assignor to Beckman Instruments, Inc., Fullerton, Calif., a corporation of California Application April 11, 1957, Serial No. 652,116

7 Claims. (Cl. 148—33)

This invention relates generally to an improved transistor structure and method of making the same, and more particularly to a transistor structure which includes a region which is small in more than one direction and a method of making the same.

As transistors are used at higher and higher frequencies, it is found that one region of the structure must be made small in more than one dimension.

It is an object of this invention to provide a transistor structure which includes a region small in two directions and a method of making the same.

It is another object of the present invention to provide a transistor structure in which a pair of regions of the same conductivity type have a plane of voids surrounded by a relatively thin region of semiconductive material of opposite conductivity type separating the same.

It is another object of the present invention to provide a transistor structure in which zones of the same conductivity type are separated by a relatively thin zone of opposite conductivity type and including voids passing therethrough.

It is another object of the present invention to provide a transistor structure which includes a pair of zones of the same conductivity type having an array of voids disposed in a plane therebetween, said voids being surrounded by semiconductive material of opposite conductivity type and the inner surface of said voids being provided with a degenerate layer having a relatively high conductivity.

It is another object of the present invention to provide a method for forming a transistor structure in which a pair of regions of the same conductivity type have distributed therebetween in a plane voids surrounded by material of opposite conductivity type.

These and other objects of the invention will become more clearly apparent from the following description when taken in conjunction with the accompanying drawing.

Referring to the drawing.

Figure 1:
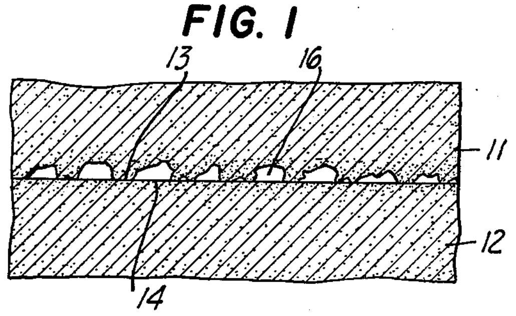
Figures 1–3 show the steps of forming a transistor structure in accordance with the invention.

Referring to Figure 1, blocks 11 and 12 of semiconductive material of the same conductivity type, for example, n-type, have optically flat surfaces 13 and 14 formed thereon respectively. The surface 13 includes a plurality of grooves 16 which run generally parallel to one another, that is, the surface has controlled roughness. The surface 14 may be formed by well known techniques such as polishing. The surface 13 may be formed by grinding or the like to give a plurality of grooves 16 which run generally parallel to one another across the respective block.

The two surfaces are brought together as indicated in

Figure 2:
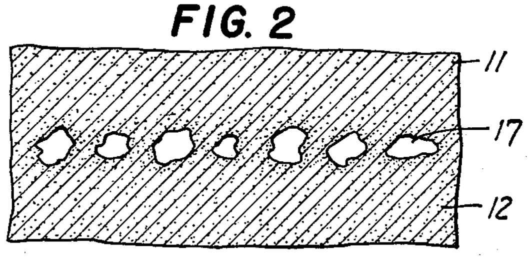
Figure 3:
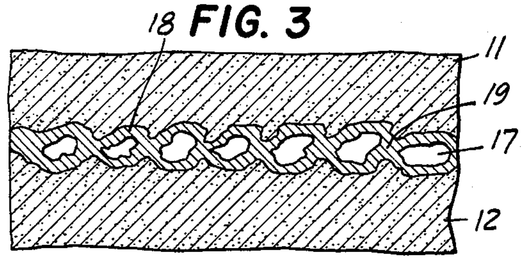

Figure 1. The blocks are placed in a suitable oven. Pressure is then applied between the surfaces. The pressure at the peaks of the rough surface serves to decrease the melting point. The temperature of the oven is raised to near that of the melting point of the material of the blocks 11 and 12. Under these conditions, the material at the peaks melts and the blocks will join into a single block. Diffusion or evaporation, or a combination of the two, may also enter into the welding or joining process. A layer of voids 17 remains, such as shown in Figure 2. Acceptors or donors are then diffused into the semiconductor via the voids resulting in a layer 18, Figure 3, which separates the regions 11 and 12 and which surrounds the voids.

For example, if n-type material is employed, then the diffusion is carried out in the presence of acceptors to form a p-type layer 18. If the acceptor is diffused under conditions which will produce a degenerate layer on the surface of the void, a high conductivity layer will exist along each of the voids. If the diffusion is carried out in a sufficient length of time so that the p-type becomes continuous, an n-p-n junction transistor is formed which includes a continuous base layer. If a degenerate layer is formed, connection is made to the layer along the low resistance surface of the voids and the base resistance is considerably lowered. It is noted that the base layer 19 can be made very thin by controlling the diffusion. The layer is relatively narrow between voids resulting in a layer which is small in two directions.

Figure 4:
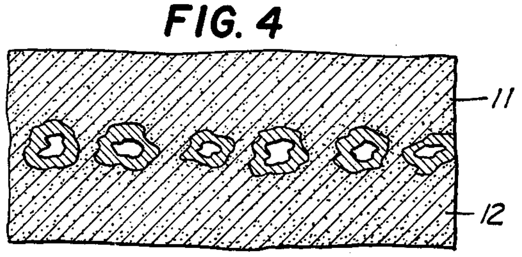
Figure 4 shows another transistor structure constructed in accordance with the invention.

If the diffusion is carried out for a shorter period of time, a structure of the type shown in Figure 4 results. An n-type conductivity region exists through the layer including the voids. The resulting structure may then be used as a unipolar transistor.

In the making of the device, the skin which forms on the device during the diffusion operation is removed by etching, cutting or the like. Suitable contacts are made to the various regions. The contact to the layer including the voids is made along the edges to which the voids extend.

Preferably, the polished block of material is used as the drain or collector. It is also preferable that this block of semiconductive material have a relatively high resistivity so that the gate to drain or base to collector capacitance is relatively low. It is preferable to use a relatively low resistivity type region for the grooved block which serves as an emitter or source, in order to have higher injection efficiency and trans-conductance.

In my copending application Serial No. 647,236, March 20, 1957, there is described an improved high frequency transistor in which the layer separating a pair of regions of the same conductivity type is formed by alloying techniques in which a eutectic mixture is employed. The same alloying techniques lend themselves admirably to the formation of voids in a structure in which subsequent diffusion may be carried out as previously described. In this method the temperatures become less criticial.

Figure 5:
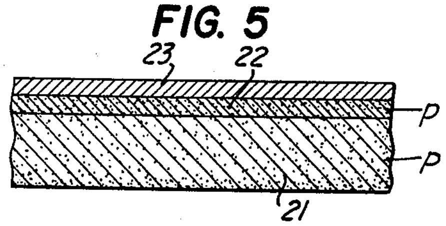
Figures 5–8 show another method of forming a transistor structure which includes voids disposed in a plane.
Figure 6:
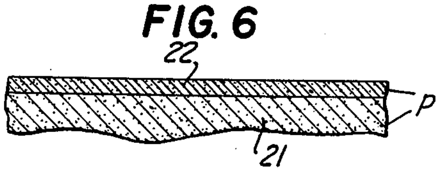
Figure 7:
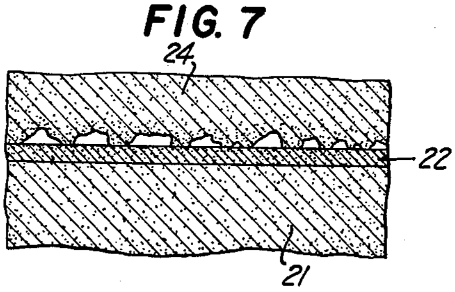
Figure 8:
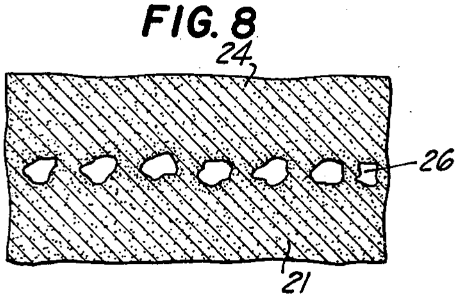

Referring to Figure 5, a polished block 21 of p-type material has a p-type impurity metal such as aluminum alloyed thereto. A p-type layer 22 having a lower melting point and a eutectic layer 23 are formed. Subsequently, the top layer 23 is removed with a suitable etch to leave a polished p-type layer, Figure 6. A block 24 having a plurality of grooves, as previously described, is brought into contact with the layer 22, Figure 7. Pressure and heat are applied. The layer 22 melts and joins with the block 24. The resulting structure includes voids 26 running through the material, Figure 8. The block is treated by carrying out a diffusion operation, as previously described. A suitable unipolar or p-n-p transistor is formed.

It is apparent, of course, that in either method one may start with a material of opposite conductivity type than that described herein and that the resulting structure would be a n-p-n transistor.

It is seen that an improved transistor structure is provided. The structure includes a center region which is small in two directions.

I claim:

1. A transistor structure including first and second regions of the same conductivity type, and a segmented diffused layer of opposite conductivity type between said first and second regions, said segmented diffused layer being provided with a plurality of voids.

2. A transistor structure including first and second regions of the same conductivity type and a diffusion layer of opposite conductivity type separating said regions, said layer being provided with a plurality of voids.

3. A transistor structure including first and second layers of the same conductivity type and a diffusion layer of opposite conductivity type separating said layers, said layer containing a plurality of voids, and a degenerate layer formed on the surfaces defining said voids to increase the conductivity along the same.

4. A transistor structure including first and second regions of the same conductivity type, a segmented diffusion layer of opposite conductivity in which the segments extend towards one another to form a relatively short narrow region of the same conductivity type joining the first and second regions, said segmented diffusion layer containing a plurality of voids.

5. A structure as in claim 4 wherein a degenerate layer is formed on the surfaces defining said voids to increase the conductivity along the same.

6. A transistor structure including first and second regions of the same conductivity type, and a segmented diffusion layer of opposite conductivity type between said first and second regions, adjacent segments being contiguous whereby relatively short narrow regions of opposite conductivity type are formed between the first and second regions, said segmented diffusion layer containing a plurality of voids.

7. A transistor structure as in claim 6 wherein a degenerate layer is formed on the surfaces defining said voids to increase the conductivity along the same.

References Cited in the file of this patent

UNITED STATES PATENTS

| | | |
|---|---|---|
| 2,569,347 | Shockley | Sept. 25, 1951 |
| 2,743,201 | Johnson et al. | Apr. 24, 1956 |
| 2,748,041 | Leverenz | May 29, 1956 |
| 2,776,920 | Dunlap | Jan. 8, 1957 |
| 2,780,569 | Hewlett | Feb. 5, 1957 |
| 2,790,037 | Shockley | Apr. 23, 1957 |